Jan. 18, 1966  J. E. LITTLECHILD  3,230,279
MANUFACTURE OF SINTERED URANIUM DIOXIDE BODIES
Filed May 4, 1962  2 Sheets-Sheet 1

United States Patent Office 3,230,279
Patented Jan. 18, 1966

3,230,279
MANUFACTURE OF SINTERED URANIUM
DIOXIDE BODIES
James Edgar Littlechild, Lytham St. Annes, England, assignor to United Kingdom Atomic Energy Authority, London, England
Filed May 4, 1962, Ser. No. 192,393
Claims priority, application Great Britain, May 9, 1961, 16,818/61
4 Claims. (Cl. 264—.5)

This invention relates to the manufacture of uranium dioxide bodies.

Bodies of sintered uranium dioxide of varying enrichment in the U235 isotope and of the highest possible density are particularly suitable as a fuel for nuclear reactors and in the manufacture of such bodies uranium dioxide powder is frequently mixed with a bonding agent before granulation, pressing or other treatment for shaping the body. Subsequently this bonding agent has to be removed by heating.

According to the present invention uranium dioxide bodies containing a bonding agent are debonded in a fluidised bed. The debonded bodies may be subsequently sintered in the same fluidised bed or in a second fluidised bed. The fluidised bed preferably comprises powdered sintered uranium dioxide fluidised with carbon dioxide at a temperature of 800° C. for the debonding process and with hydrogen at a temperature of 1650° C. for the sintering process.

By way of example alternative methods of carrying the invention into effect will now be described with reference to FIGURES 1 and 2 of the accompanying drawings which are diagrammatic.

Figure 1:
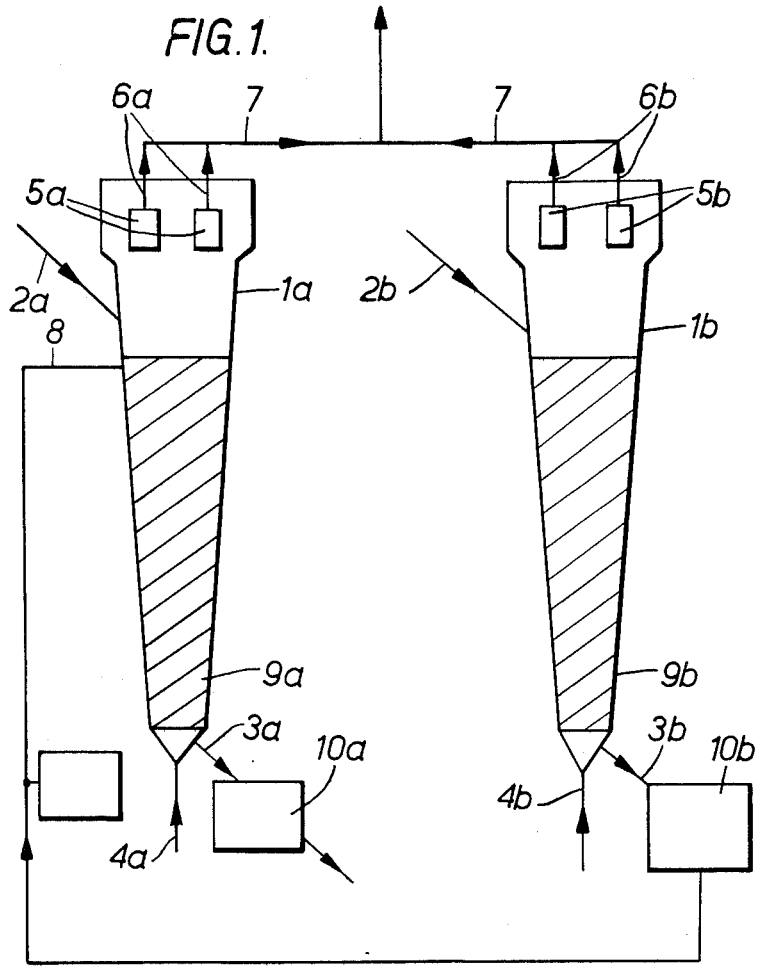

In FIGURE 1 of the drawings are shown two heated reactors 1a, 1b, each reactor having an inlet pipe 2a, 2b, respectively, through which bodies are introduced to the reactors, and an outlet 3a, 3b, respectively, through which processed bodies leave the reactors. Each reactor contains a bed of sintered uranium dioxide powder 9a, 9b fluidised by gas introduced through an inlet pipe 4a, 4b and leaving through blow-back filters 5a, 5b each having their own outlet lines 6a, 6b and connecting to a common outlet 7 from which the fluidising gases pass to a scrubbing system before recirculation or dispersal to atmosphere. The outlet 3a from the reactor 1a connects with the inlet pipe 2b of the reactor 1b through a gas lock 10a and the outlet 3b includes a screen 10b which removes fines from the product. These fines are returned to the reactor 1a through a pipe 8.

In operation uranium dioxide bodies containing a bonding agent are continuously introduced into the reactor 1a through the inlet pipe 2a and carbon dioxide gas at 800° C. is introduced into the base of this reactor through the inlet pipe 4a. The carbon dioxide is suitably distributed to produce an evenly fluidised bed system and the reactor is tapered so that a quiescent zone is produced at the top of the bed and the gentle powder agitation limits the amount of powder entrained in the exit gas which leaves through the filters 5a, outlet lines 6a and common outlet 7. The uranium dioxide bodies circulate and descend through the fluidised powder in the reactor. During their circulation and descent the bonding agent is removed from them and passes, with the exit gases, through the filters 5a. The debonded uranium dioxide bodies and some of the powder forming the fluidised bed leave the reactor 1a continuously through the outlet 3a, pass through the gas lock 10a, and are mechanically or pneumatically elevated to the inlet pipe 2a of the second reactor 1b. (The debonded bodies are friable and there is therefore no screening to remove fines at this stage.)

From the inlet pipe 2b the debonded uranium dioxide bodies from the reactor 1a are continuously fed into the reactor 1b in which the bed 9b of sintered uranium dioxide powder is fluidised by hydrogen gas at 1650° C. introduced through the inlet 4b. Having fluidised the powder the hydrogen gas leaves through the filters 5b, outlet lines 6b and common outlet 7. As in reactor 1a the reactor 1b is suitably dimensioned to produce a quiescent zone at the top of the bed 9b. The debonded uranium dioxide bodies descend through the fluidised bed 9b are sintered during their descent and are removed through the outlet 3b. After leaving the outlet 3b the bodies are screened to separate any powder which may have become associated with them and this powder is returned to the reactor 1a through the pipe 8. The screened bodies may then be ground to size, if necessary, ready for use as nuclear fuel.

Figure 2:
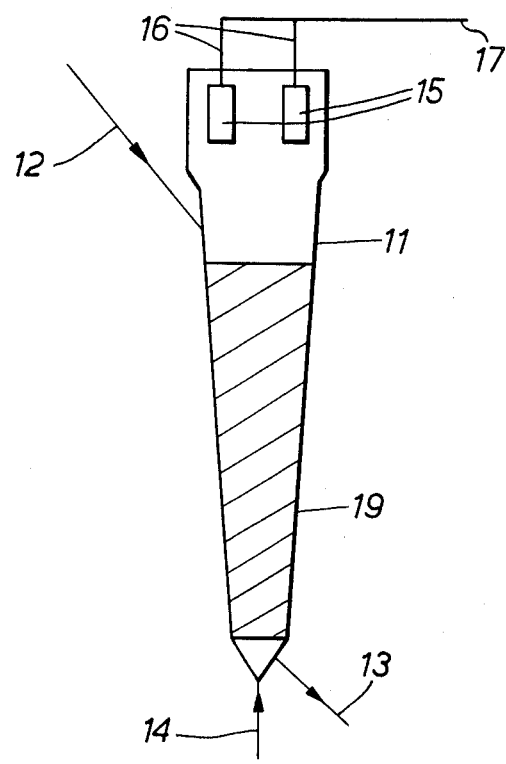

In the alternative method illustrated by FIGURE 2 debonding and sintering of the uranium dioxide bodies is carried out by batch operation, both debonding and sintering being completed in the same fluidised bed. In FIGURE 2 is shown a heated reactor 11 having an inlet pipe 12 through which bodies are introduced into the reactor and an outlet pipe 13 which provides an exit for the debonded and sintered bodies. Fluidising gas is introduced at the reactor base through an inlet pipe 14, passes through a bed 19 of sintered uranium dioxide powder—fluidising the powder as it passes—and leaves through blow-back filters 15 and outlet lines 16 to a common outlet 17 communicating with a stack from which the gas may be scrubbed, then recirculated or discharged to atmosphere.

In operation a charge of shaped uranium dioxide bodies containing a bonding agent is introduced into the reactor 11 through the inlet pipe 12, the bed 19 of sintered uranium dioxide powder being maintained at 800° C. and fluidised by carbon dioxide introduced through the inlet pipe 14. The bodies remains suspended in the bed 19 and the temperature conditions are maintained in the reactor until removal of the bonding agent is completed. When this has been achieved the fluidising gas is gradually changed from carbon dioxide to hydrogen gas, the temperature of the fluidised bed is increased to 1650° C. and the bodies are suspended in the bed until sintering is completed. The temperature of the system is then allowed to fall and the bonded and sintered bodies are removed from the reactor through the outlet pipe 3 and screened. The bodies are now ready for grinding to size, if necessary, and use as nuclear fuel.

The shaped uranium dioxide bodies for debonding and sintering may be prepared by conventional methods. For example, in one known process uranium dioxide powder free from contamination with fluoride ion is ball milled to produce a more homogeneous powder, the powder is granulated with the aid of a bonding agent and the granulated material is sieved so that particles of the required size for pressing can be selected. The selected sieved material is then compressed by a mechanical operation to form a suitably shaped compact which may be heated directly in the manner of the present invention and then sintered. In this way, using a bonding agent such as polyvinyl alcohol or a solution of a mixture of polybutylmethacrylate and dibutylphthalate in acetone, pellets 0.3 to 0.4 in. in diameter may be produced. Alternatively the shaped compact may be broken down into irregularly shaped particles which are subsequently shaped into spheroids. These spheroids may then be heated in the manner of the present invention and sintered. A suitable bonding agent in this alternative is aluminium stearate.

The invention may be carried out on a large scale without cracking or chipping of the uranium dioxide bodies. The temperature of the process may be efficiently controlled and a uniform product may be obtained. It is also possible to treat by the method of the invention uranium dioxide bodies containing some fluoride ion. In a conventional sintering furnace the furnace lining is damaged by hydrogen fluoride produced in the sintering of uranium dioxide bodies containing fluoride. In the fluidised bed system the design and materials of construction can be chosen to avoid damage by hydrogen fluoride.

I claim:

1. A method of producing a sintered uranium body said method comprising the steps of granulating uranium dioxide powder with the aid of a bonding agent, sieving and collecting the granulated powder particles of the required size for for pressing, compressing the collected particles to form a shaped body, heating the shaped body in a first fluidized bed to remove the binding agent, and subsequently heating the body in a second fluidized bed to sinter the body, each of said fluidized beds including sintered uranium dioxide powder fluidized by a gas.

2. A method according to claim 1 wherein said first fluidized bed is fluidized with carbon dioxide at a temperature of approximately 800° C.

3. A method according to claim 2 wherein said second fluidized bed is fluidized with hydrogen gas at a temperature of approximately 1650° C.

4. A method of producing a sintered uranium dioxide body said method comprising the steps of granulating uranium dioxide powder with the aid of a bonding agent, sieving and collecting the granulated powder particles of the required size for pressing, compressing the collected particles to form a shaped body and heating the shaped body twice in a fluidized bed, firstly to remove the bonding agent and then, at a higher temperature, to sinter the body.

References Cited by the Examiner

UNITED STATES PATENTS

| | | |
|---|---|---|
| 3,051,566 | 8/1962 | Schwartz. |
| 3,075,244 | 1/1963 | Glenn _____ 176—90 X |

FOREIGN PATENTS

| | | |
|---|---|---|
| 608,084 | 11/1960 | Canada _____ 23—14.5 |

OTHER REFERENCES

Harrington: "Uranium Production Technology," pp. 192, 204–207, D. Van Nostrand Co., New York (1959).

Martin et al.: "Chem. Processing Engineering," vol. 41, No. 7, pp. 291–294, 303, July 1960.

Chemical Engineering, pp. 193–206, July 1955.

CARL D. QUARFORTH, *Primary Examiner.*

REUBEN EPSTEIN, *Examiner.*